United States Patent [19]

Pirkel

[11] Patent Number: 4,878,512

[45] Date of Patent: Nov. 7, 1989

[54] VALVE MECHANISM

[75] Inventor: Fred L. Pirkel, Phoenixville, Pa.

[73] Assignee: Ogontz Controls Company, Willow Grove, Pa.

[21] Appl. No.: 165,427

[22] Filed: Mar. 1, 1988

Related U.S. Application Data

[63] Continuation of Ser. No. 555,379, Nov. 28, 1983, abandoned, which is a continuation of Ser. No. 460,927, Jan. 28, 1983, Pat. No. 4,460,007 issued Jul. 17, 1984.

[51] Int. Cl.$^4$ .......................... E03B 7/10; F16K 17/38
[52] U.S. Cl. ........................................ 137/62; 137/79; 137/341; 251/74; 251/297; 236/48 R
[58] Field of Search .................. 137/79, 62, 341X; 251/11, 62, 67, 74, 297; 236/48 R

[56] References Cited

U.S. PATENT DOCUMENTS

| | | | |
|---|---|---|---|
| 3,618,890 | 11/1971 | Bastam | 251/11 |
| 4,066,091 | 6/1978 | Itoh et al. | 137/79 |
| 4,361,167 | 11/1982 | Harasewych | 137/62 |

FOREIGN PATENT DOCUMENTS 179481  11/1982  Japan ..................................... 137/79

Primary Examiner—A. Michael Chambers
Attorney, Agent, or Firm—Woodcock Washburn Kurtz Mackiewicz & Norris

[57] ABSTRACT

In a freeze protection-valve, a wax actuator is situated in a heat-conductive housing to which heat is conducted from the liquid system being protected. The housing prevents the actuator from triggering the valve to its opened condition while the liquid system is hot, but permits a rapid response when the liquid system is cool. In a snap-action freeze protection valve, the actuator is carried by the valve stem, and heat is conducted from the valve body to the valve stem through a sleeve through which the valve stem slides. The actuator moves a cam within the valve stem which operates a ball-type latch. The latch holds the valve in the closed position until the actuator releases the latch. Also disclosed is a remote-controlled valve operating mechanism which uses an electrically heated wax actuator to effect valve closure. A cam and ball mechanism relieves the force on the actuator piston as soon as valve closure takes place, thereby preventing failure of the actuator due to prolonged application of high pressures and temperatures.

2 Claims, 3 Drawing Sheets

VALVE MECHANISM

This is a continuation, of application Ser. No. 555,379, filed Nov. 28, 1983, now abandoned, which is a continuation of U.S. Ser. No. 460,927 filed Jan. 25, 1983, now U.S. Pat. No. 4,460,007 issued July 17, 1984.

BRIEF SUMMARY OF THE INVENTION

This invention relates to valves and more particularly to a novel freeze protection valve and to a valve mechanism useful in protecting liquid systems against damage due to freezing and in various other applications.

A typical use for a freeze protection valve is in protecting the cooling water system of a railroad locomotive against damage from freezing temperatures. It is common practice to provide railroad locomotive cooling water systems with one or more temperature-responsive valves which open when the ambient temperature becomes low enough to threaten damage due to freezing of the cooling water. These valves open automatically as the temperature approaches freezing, and drain water from the cooling system. Since railroad locomotives are typically in continuous operation over long periods of time, it is practical to use these valves for freeze protection instead of providing antifreeze compounds in the cooling system.

The use of freeze protection valves is not limited to railroad locomotives. They have numerous other uses, such as in chemical manufacturing plants, heating systems for buildings, and shipboard and land-based power plants and fire protection systems.

Many modern freeze protection valves make use of wax-filled thermal actuators. A wax-filled thermal actuator, or "wax actuator" comprises an actuator body filled with a hydrocarbon wax specially formulated to change from solid to liquid or from liquid to solid gradually over a predetermined temperature range. As the wax changes from solid to liquid, its volume increases. The increase in volume produces movement of an actuator piston which extends outwardly from the actuator body. Motion is transmitted from the wax to the piston through a rubber plug situated in the neck of the actuator body. The diameter of the barrel of the neck in which the rubber plug is situated is larger at the end nearest the wax than at the end nearest the actuator piston. In operation, as temperature increases, the wax melts, and the piston is extended. When temperature is reduced, the wax resolidifies and contracts in volume, and the piston can be pushed back into the actuator by an external spring.

Valves using wax actuators are of two general types. The first type is the modulating type. The modulating type valve is one in which the extent to which the valve is opened is directly related to the position of the actuator piston relative to the actuator body. This type of valve has found extensive use in freeze protection despite one significant deficiency. That deficiency results fro the fact that the actuator piston movement is continuous over a considerable temperature range with the result that a valve designed to be fully open at a particular temperature begins to open at a significantly higher temperature. If the chosen temperature range is on the high side, the valve may open unnecessarily. On the other hand, if a lower temperature range is chosen in order to avoid unnecessary valve opening, freezing of the liquid system may occur before the valve has had a chance to drain the entire system.

This deficiency of the modulating-type valve has led to the use of snap-acting freeze protection valves in which the operation of a wax actuator triggers a spring-loaded valve element, causing it to move instantaneously from a fully closed condition to a fully opened condition at an accurately predetermined temperature. Currently available snap-acting valves, however, have their own deficiencies. In some of these valves, the actuator is in contact with, and responsive to the temperature of, the liquid within the valve body. In other snap-action valves, the actuator body is in contact with, and responsive to the temperature of, the ambient atmosphere.

The first type of snap-action valve, in which the actuator is responsive to the temperature of the liquid within the valve body, has been satisfactory in many applications. However, under some conditions it may allow a remote part of the liquid system to freeze before the actuator causes the valve to snap open. This occurs when the temperature conditions and system configuration are such that the mass of water in the vicinity of the freeze protection valve does not lose heat as fast as water in a remote part of the system. Freezing of water in a remote part of the system can cause blockage of flow so that, even after the valve eventually opens, only a part of the liquid in the system is drained.

In the second type of snap-action valve, in which the actuator body is responsive to the ambient atmosphere, the actuator can cause the valve to open and drain the system when the atmosphere is cold, even though the water system is warm. This effect is known as "nuisance dumping", and is quite common.

It is an object of this invention to avoid the problems discussed above, which are inherent in previously available modulating and snap-action freeze protection valves.

In accordance with the invention, the body of an actuator, which serves as its temperature sensor, is situated at a location such that it is out of contact with the liquid in the valve chamber and in the liquid system. At least a substantial part of the sensing element is surrounded by a heat-conductive housing, and means are provided for conducting heat from the liquid system to the heat-conductive housing. So long as the liquid system is warm, the housing surrounding the sensor reduces the effect, on the sensor, of changes in ambient temperature. However, if the liquid system cools, the heat-conductive housing loses heat rapidly, and allows the sensor to respond rapidly to a drop in the ambient temperature. Thus, a freeze protection valve constructed in accordance with the invention avoids "nuisance dumping", yet responds rapidly whenever conditions are such as to threaten freezing of any part of the liquid system to which the valve is connected.

In the preferred embodiment of the invention, the actuator body is connected to and carried by the valve stem, and heat from the liquid in the valve body is conducted to the heat-conductive housing surrounding the actuator body through the valve stem. A latch, which holds the valve element closed under normal conditions, comprises balls held against axial movement in radial passages in the valve stem and a cam, operated by the actuator, causing the balls to project outwardly underneath a latching step in a sleeve through which the valve stem slides. The actuator, and the latch mechanism are thus both carried by the valve stem. When the actuator piston retracts in response to a cooling of the ambient air, the cam moves allowing the balls to move inwardly, clearing the latching step and allowing the valve stem to move upwardly, opening the valve element. Resetting of the valve is accomplished simply by heating the actuator, if necessary, and pressing manually on the end of the valve stem, as will appear from the detailed description which follows.

The ball-type latch mechanism carried by the valve stem is extremely simple in structure and operation, and lends itself to use in snap-acting valves having other types of actuators, including solenoid actuators, and temperature or pressure-responsive bellows actuators.

Because the temperature sensor is carried by the valve stem, a conventional freeze protection valve of the modulating type can be readily converted to a snap-action valve simply by replacing the valve stem assembly.

A related device takes advantage of a wax actuator in resetting a snap-acting valve by remote control. In this device, the actuator body is fixed to the valve body, and the valve stem includes a ball cage, the balls being arranged to move radially outwardly and engage a latching step on a neck assembly fixed to the valve body. Within the valve stem, a cam is urged by a spring against the actuator piston and controls movement of the latching balls.

Provision is made for applying heat to the actuator electrically by remote control. Opening of the valve is effected automatically as the actuator piston retracts under cold ambient conditions. Resetting is accomplished by applying heat through the electrical heater. This causes the actuator piston to extend, pushing the valve closed. When the valve reaches its closed condition, the latching balls are moved outwardly by the cam, and hold the valve element closed. In this device, the actuator itself serves as a "motor" to effect resetting. A wax actuator is capable of exerting a large force, and therefore will easily effect valve closure when it is heated by remote control. However, the actuator cannot be used reliably to hold the valve closed because, under prolonged application of high temperature and pressure, the rubber plug in the neck of the actuator body tends to adhere to the neck, causing failure of the actuator. In accordance with the invention, as soon as the valve is reset, the valve element is held closed by the ball latch, and the only pressure exerted against the actuator piston is a relatively small pressure exerted by a spring which holds the latching cam against the actuator piston.

This remote-resetting valve may have also have the feature that its actuator is at least partially surrounded by a heat-conductive housing to which heat is conducted from the system liquid. Thus, the device is usable as a rapid-response freeze protection valve which avoids the problem of nuisance dumping.

The remote-resetting feature makes the valve usable as a block valve in an instrument manifold, and in many other applications where remote control is desirable.

The mechanical structure of the remote-resetting valve is also advantageous for use with actuators other than the wax actuator, such as solenoids, and temperature or pressure-responsive bellows actuators.

It is therefore another object of this invention to provide a structurally simple and effective remote-controlled valve resetting mechanism, and to take advantage of the characteristics of a wax actuator in a remote-controlled valve resetting mechanism.

Various other objects and advantages of the invention will be apparent from the following detailed description.

DETAILED DESCRIPTION

Figure 1:
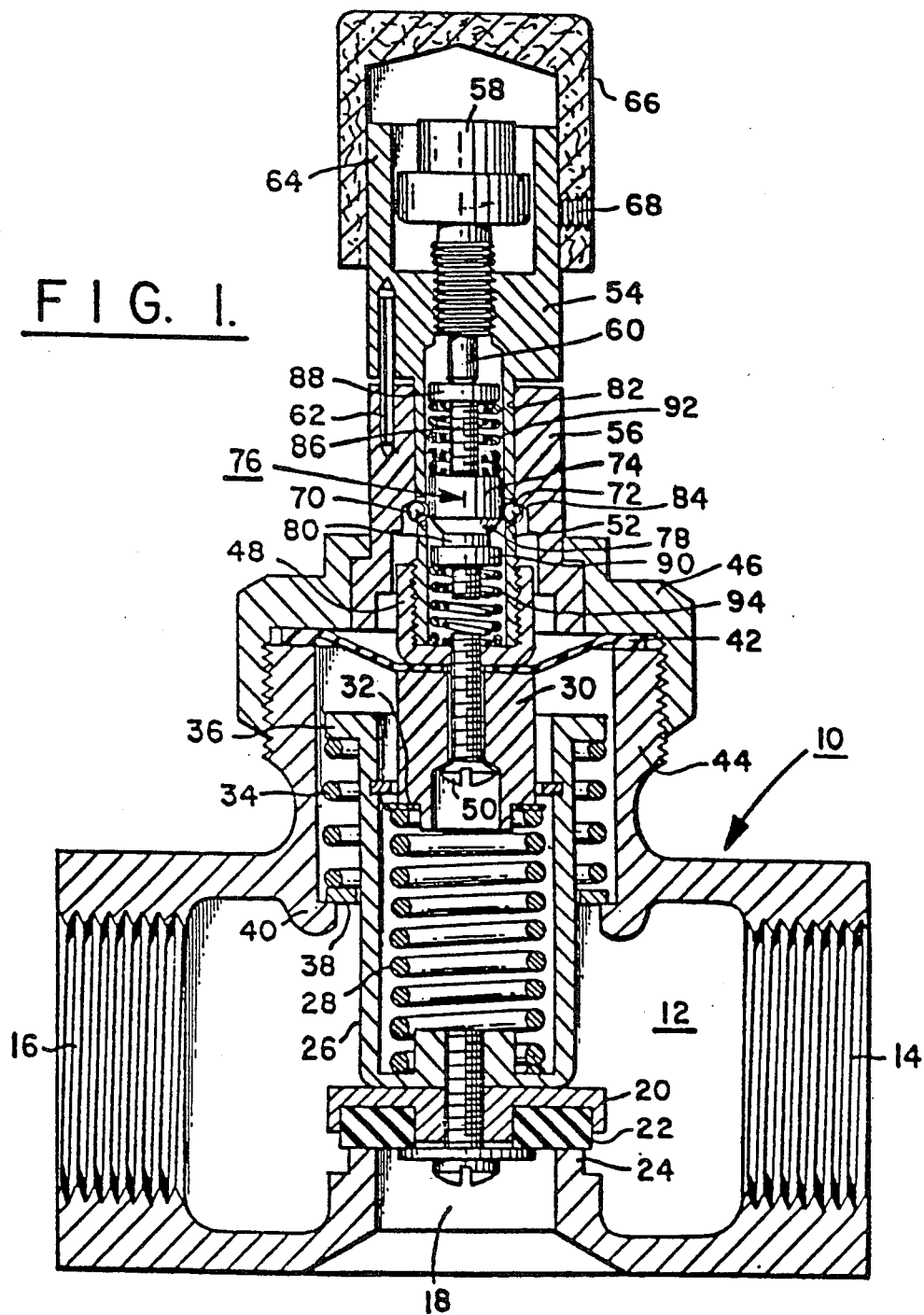
FIG. 1 is a vertical section through a wax-actuator controlled, snap-action freeze protection valve in accordance with the invention, showing the valve latched in its closed condition, and also showing the actuator housing with an insulating closure.

FIG. 1 shows a valve body 10 having a valve chamber 12 with ports 14 and 16 connectable to a liquid system such as the cooling water system of a railroad locomotive. The valve body also has a drain port 18 which is closed by a valve element 20 having an elastomeric valve plug 22 held against valve seat 24.

The valve element is secured by a screw to a cage 26 which houses a spring 28. Valve stem element 30 bears downwardly against a ring 32, and spring 28 is in compression between ring 32 and the bottom of cage 26. A spring 34 is held between flange 36 of cage 26 and ring 38 on shoulder 40 of the valve body.

As thus far described, the valve mechanism is similar to that of a conventional modulating freeze protection valve. Spring 28 corresponds to the overtemperature spring, which, in the modulating valve, allows the actuator to expand under high temperature conditions. In the valve of FIG. 1, which is a snap-acting valve, spring 28 serves merely to insure that the valve element is held closed against its seat. This spring is unnecessary if the valve mechanism is properly adjusted.

Spring 34 is the operating spring of the valve, urging the valve element toward its open condition. Spring 34 opens the valve when the latch is released.

Spring 28 must be stronger than spring 34, and spring 28 must be such that in its relaxed condition it is only slightly longer than as shown in FIG. 1.

A synthetic rubber diaphragm 42 is clamped onto the upper end of neck 44 of the valve body by a cap 46. This diaphragm prevents liquid within the valve body from flowing upwardly into the valve latch mechanism. The central portion of the diaphragm is clamped between element 30 and stem cap 48 at the bottom of the latch mechanism. A screw 50 extends upwardly through element 30 and the central portion of diaphragm 42, and is threaded into cap 48.

Cage 52 is a cylindrical extension of actuator carrier 54. The cage extends from actuator carrier 54 downwardly into sleeve 56, which is press fit into cap 46. The body of a wax actuator 58 is threaded into actuator carrier 54, and the piston 60 of the actuator extends downwardly from the actuator body into the interior of cage 52. If desired, the actuator can be locked in its carrier by a set screw (not shown). The actuator carrier is prevented from rotating with respect to sleeve 56 by a sheet metal spring pin 62 which is fixed to sleeve 56 and extends upwardly into a hole in carrier 54.

Actuator carrier 54 has a cylindrical wall 64 which extends upwardly and surrounds a substantial part of the actuator body, which constitutes the temperature sensing element of the actuator. Wall 64 serves as a heat-conducting housing. Heat from the liquid in the valve body is conducted through neck 44, cap 46 and sleeve 56 to cage 52. The cage and the inner wall of sleeve 56 should be in close engagement with each other over a significant area, at least when the valve is latched closed, in order to provide for good conduction of heat from the sleeve to the cage. Heat is conducted from the cage upwardly to the actuator carrier 54 and to wall 64 which surrounds the actuator.

An insulating closure 66, in the form of a cap is placed over the top of the actuator carrier, and is secured in place by a set screw 68. This closure may take various forms. In FIG. 1, the closure consists of insulating material which controls the rate of heat loss from the actuator housing. The rate of heat loss can be adjusted by using closures of different thicknesses, materials, shapes or sizes.

Metal balls 70 and 72 are two of a series of balls arranged in a ring. Each ball is held in its own radial opening in the wall of cylindrical cage 52 against axial movement with respect to the cage. The balls are prevented from inwardly movement by the cylindrical outer surface 74 of a cam 76. Cam 76 also has a frusto-conical downwardly facing surface 78 which meets a smaller cylindrical surface 80 of the cam to provide a space into which the balls can move when cam 76 moves upwardly.

Inner surface 82 of sleeve 56 has a downwardly facing, frusto-conical latch step 84 which is preferably disposed at an angle of approximately 15° with respect to horizontal (i.e. 75° with respect to the axis of cylindrical cage 52). In FIG. 1, balls 70 are held by cylindrical surface 74 of cam 76 so that they project outwardly from the cage and engage latching step 84, thereby holding the cage in its latched position. The cage, in turn, operating through cap 48, element 30 and spring 28, holds plug 22 of valve element 20 against seat 24, closing off drain port 18.

The relative strengths of springs 28 and 34 are such that spring 34 will not cause cage 26 to move upwardly against spring 28 when the valve stem is latched down by the engagement of the balls with the latching step. However, when the latching mechanism is released, spring 28 expands to a condition such as to allow operating spring 34 to raise the valve element and open the drain port.

A threaded stem 86 extends inside cage 52 along the axis of the cage. It has a head 88 engaged by actuator piston 60. A flange 90 threaded onto stem 86 supports cam 76. However the cam is provided with a central opening which clears the threads of stem 86 so that the stem can move downwardly while the cam remains stationary.

A pair of coaxial coil springs, the outer one of which is indicated at 92, are in compression between head 88 and the top of cam 76. A similar pair of springs, the outer one of which is indicated at 94, are in compression between flange 90 and the horizontal bottom of cap 48.

In operation of the device, assuming that the valve is closed and the latch is set as shown in FIG. 1, so long as water within the valve body is warm, heat is conducted to the actuator housing. This heat prevents the actuator from being cooled by low ambient temperatures in the surrounding atmosphere to such an extent as to trigger the valve to its opened condition. However, when the water in the liquid system cools, the actuator housing loses heat, and no longer protects the actuator from low ambient temperatures. The actuator housing, because of its relatively low mass, loses heat rapidly when the liquid in the liquid system cools. Therefore, there is no significant delay between the time the liquid system cools and the time at which the actuator is first enabled to respond to low ambient temperatures.

Assuming the liquid in the liquid system is cool, a low ambient temperature (in the range for which the actuator was designed) will cause the actuator's piston 60 to retract. Spring 94 will then push upwardly on flange 90, which in turn pushes upwardly on threaded stem 86 as well as cam 76. When the cam moves upwardly a sufficient distance, the latching balls are allowed to move inwardly, and are caused to move inwardly by reason of the slope of conical step 84 and the action of valve operating spring 34. As soon as the balls clear the step, the entire valve stem assembly snaps upwardly under the action of spring 34, and the valve opens to drain the liquid system.

Figure 2:
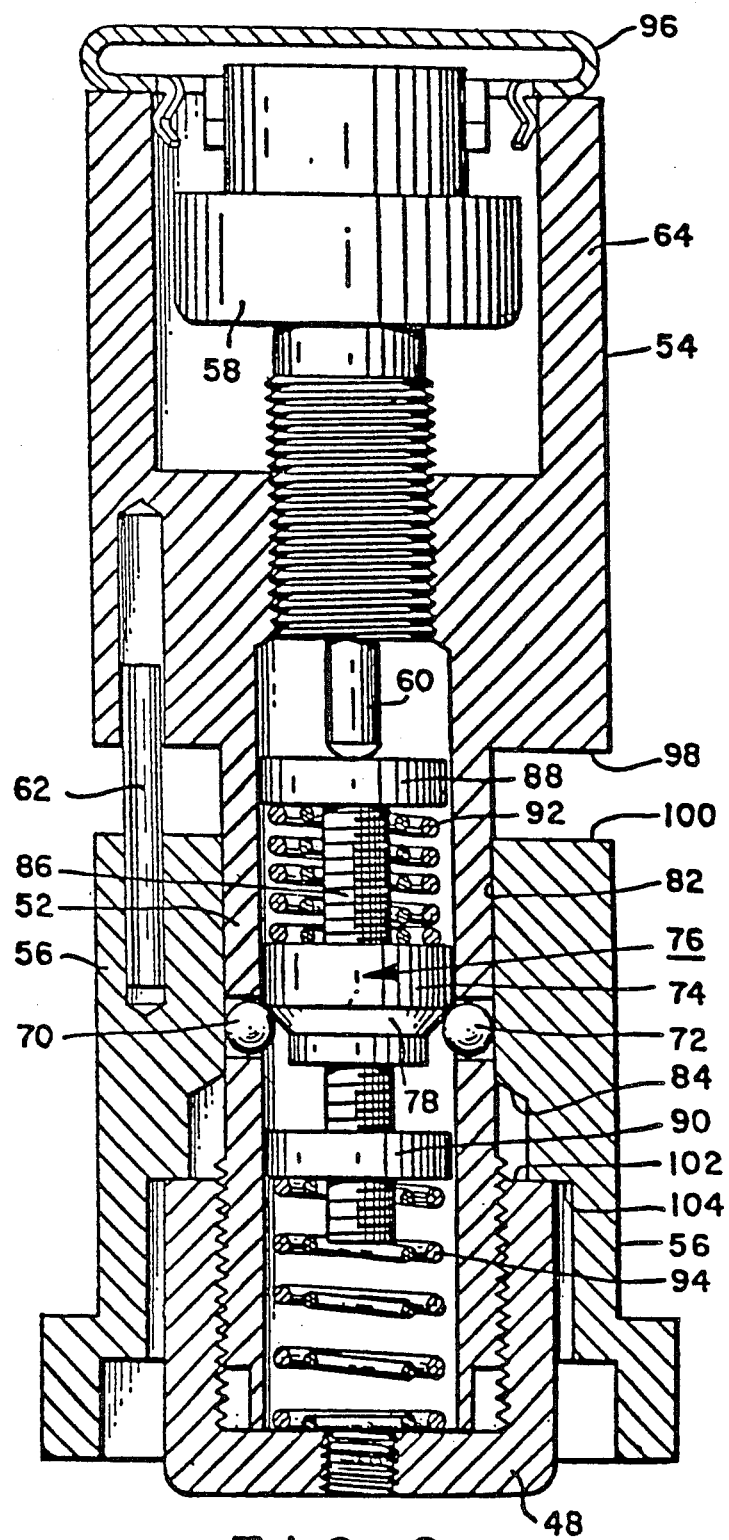
FIG. 2 is a vertical section showing the valve-operating mechanism of FIG. 1 in its unlatched condition, and also showing an alternative form of closure on the actuator housing.

When the valve is open, cage 52 moves to the condition illustrated in FIG. 2, in which the balls are in engagement with inner surface 82 of sleeve 56, and located some distance above latching step 84.

If, while the valve is in its open condition, heat is applied to the actuator, its piston 60 will move downwardly. Heat may be applied to the actuator, for example, to prepare it for resetting. To prevent the actuator from being damaged when heat is applied, provision is made for downward movement of threaded stem 86 while cam 76 is locked in position by the latching balls as shown in FIG. 2. Piston 60 of the actuator presses down on head 88 of threaded stem 86, and the threaded stem moves downwardly against springs 92 and 94 and their smaller internal springs. With the mechanism in the position shown in FIG. 2, shoulder 98 of actuator carrier 54 is separated from shoulder 100 of sleeve 56, while shoulder 102 of cap 48 bears against shoulder 104 of sleeve 56 to limit upwardly movement of the movable assembly.

In resetting, the heat is first applied to the actuator housing, and then the actuator housing is simply depressed manually until the balls clear latching step 84. As soon as this occurs, conical surface 78 of cam 76, which is disposed at a steeper angle than surface 84 (e.g. 45°) causes the balls to move outwardly underneath latching step 84. When the balls clear cylindrical surface 74 of the cam, the cam is moved downwardly by spring 92 and the smaller internal spring, into engagement with flange 90, whereupon the balls can no longer move inwardly, and the valve is latched closed with all parts in the condition illustrated in FIG. 1.

If, in resetting, the ball detents do not project outwardly underneath latching step 84 to the fullest possible extent, latching will take place, but the value may not be tightly closed. Heat conducted to the actuator housing from the liquid system will eventually cause the actuator piston to extend further downwardly causing cam 76 to drive the ball detents outwardly so that the device automatically assumes its fully latched condition. This is made possible by the fact that cam surface 78 is steeper than latching surface 84, so that the cam can drive the balls outwardly against the latching surface, tightening the valve.

The apparatus of FIG. 2 can easily be installed in a wide variety of conventional valves with minimal modifications to the valves. Therefore, the latching mechanism may be used advantageously with various alternative forms of actuators, including electrically operated solenoids, and pressure or temperature-operated bellows.

FIG. 2 shows an alternative form of protective closure 96. Closure 96 is a heat-conductive metal closure which snaps into the open upper end of wall 64 and serves as part of the actuator housing. A closure such as closure 96 may be used where it is unnecessary to use an insulated cap to reduce the rate of heat loss from the actuator housing. In some applications it may be unnecessary to use a closure of any kind.

The mechanism of FIG. 2 can be used to cause a valve to snap closed in response to operation of an actuator. This may be easily accomplished, for example, by redesigning the valve body so that the valve element moves upwardly against a seat rather than downwardly.

It will also be apparent that the latching mechanism may be redesigned to provide for snap-action opening or closing movement of a valve upon extension of an actuator piston rather than upon retraction thereof. This may be accomplished by a modified design in which the direction of the cam is reversed so that the latching balls are permitted to move inwardly as the cam descends upon extension of the actuator piston.

Numerous other modifications in the details and configuration of parts may of course be made without departing from the scope of the invention as defined in the claims.

Figure 3:
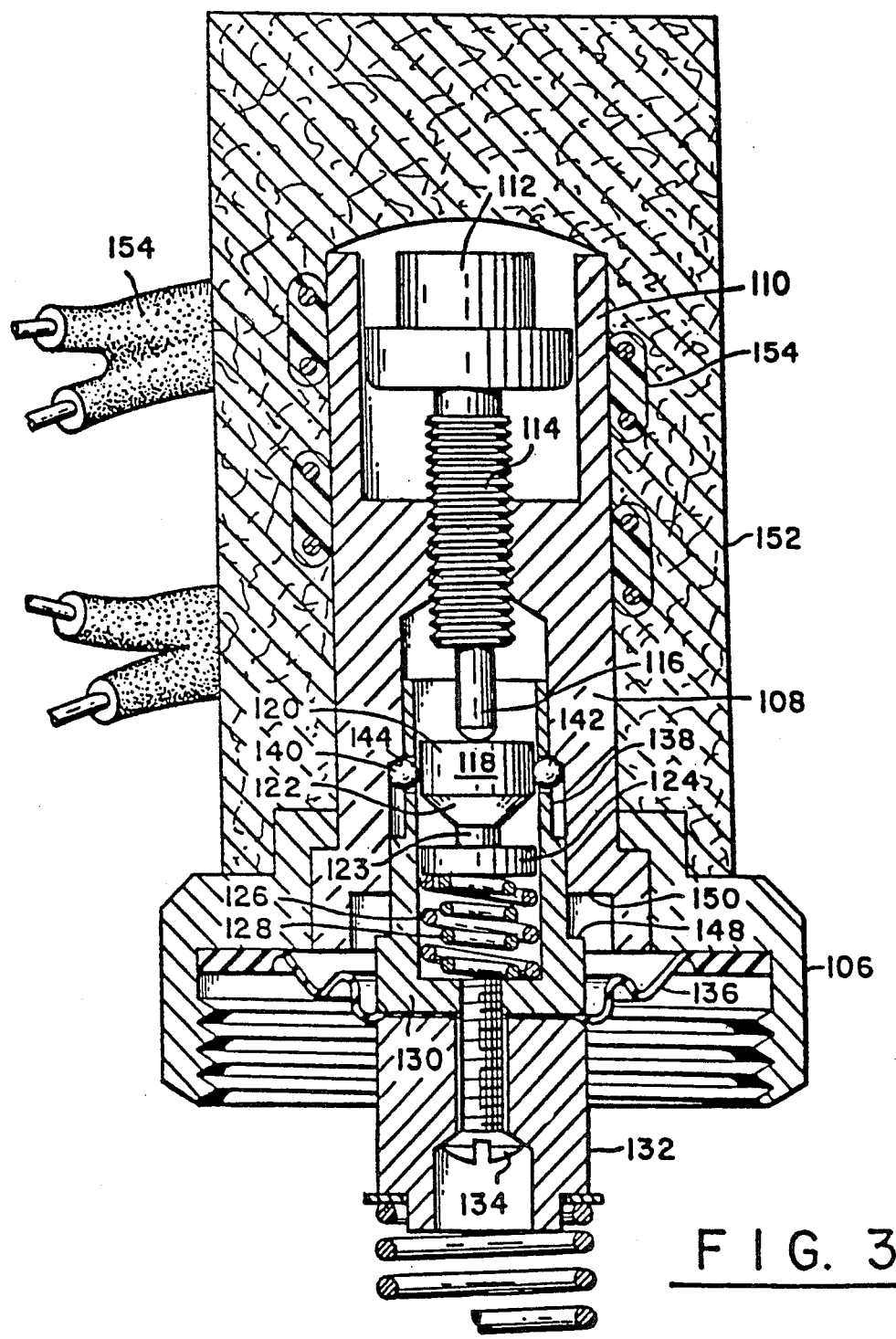
FIG. 3 is a vertical section through a remote-controlled valve resetting mechanism in accordance with the invention.

Referring now to FIG. 3, a remote-controlled valve resetting mechanism is shown comprising a cap 106, which corresponds to cap 46 in FIG. 1, and which is designed to be threaded onto the threaded neck of a conventional valve body such as the valve body shown in FIG. 1. A neck 108 is press fit into the cap, and extends upwardly therefrom. This neck includes an actuator housing 110 which encloses a substantial part of a wax actuator 112. The threaded stem 114 of the actuator is threaded into the neck itself. Therefore, the body of the actuator is fixed with respect to the valve body, unlike the actuator in FIGS. 1 and 2, which is movable with the valve stem.

Actuator piston 116 bears against the top of a cam 118. The cam has a cylindrical surface 120, a downwardly facing frusto-conical surface 122 terminating in a smaller-diameter cylindrical surface 123, and a disc 124 having a diameter aproximately equal to that of cylindrical surface 120. All of the elements of the cam are fixed together, and the cam is urged upwardly against actuator piston 116 by coil springs 126 and 128. The cam and the springs are located in a cage 130 to which is secured a stem element 132 by means of a screw 134. A diaphragm 136 is clamped between the bottom of cage 130 and the top of stem element 132, and its periphery is designed to be clamped between cap 106 and the neck of a valve body.

Cage 130 is movable vertically with respect to neck 108 in a cavity in the neck. An upwardly extending cylindrical part 138 of the neck holds a ring of latching balls including balls 140 and 142 in a series of radial holes.

As shown in FIG. 3, the balls are held outwardly underneath a downwardly facing frusto-conical latching step 144 in neck 108 by cylindrical surface 120 of cam 118.

The neck is surrounded by insulation 152, and heat trace wire 154 is wound about neck 108 so that the neck may be heated electrically by remote control.

When the mechanism of FIG. 3 is used to control a freeze protection valve, it operates in a manner similar to the device of FIGS. 1 and 2 in that heat conducted from the valve body to the actuator housing prevents the actuator from responding to cold ambient temperatures until the water in the system cools. The amount of insulation surrounding the neck of the device can be adjusted to control the rate of heat loss from the neck so that the actuator is enabled to respond promptly to drops in ambient temperature as soon as the water system cools.

The device of FIG. 3 is designed to be attached to a valve body similar to the valve body shown in FIG. 1. The latch mechanism is shown in its latched condition, i.e. the condition which it would be in if the valve of FIG. 1 were closed.

Assuming that the liquid system is cool and that electrical heat is not applied to the neck, a reduction in ambient temperature will cause piston 116 of the actuator to retract, allowing springs 126 and 128 to move cam 118 upwardly. When the cam moves upwardly a sufficient distance, the latching balls are moved inwardly by the action of frusto-conical step 144 and the valve operating spring (not shown in FIG. 3). When the balls clear the latching step, the valve element is under the control of the valve operating spring and actuator piston 116. As actuator piston 116 retracts further, the valve opens to drain the liquid system.

When current is applied to the heat trace wire, heat is conducted to the actuator housing and to the actuator body itself. This causes the actuator piston to extend downwardly. The balls are held underneath cam 118 by the narrow cylindrical wall of the upper part of the neck cavity. Therefore, extension of actuator piston 116 causes cage 130 to move downwardly, causing the valve element to move in the closing direction. The parts should be adjusted so that the valve closes just as the balls move outwardly underneath latching step 144.

As actuator piston 116 continues to moves downwardly, cam surface 122 clears the balls, and the valve is held closed entirely by the engagement of the balls with the latching step. The force of the valve operating spring against the actuator piston is relieved, and the actuator piston now operates only against the force of springs 126 and 128. Current in the heat trace can be turned off as soon as the valve closes, assuming that heat is available either from the ambient atmosphere or from the liquid system itself to maintain the actuator piston in its extended condition.

The apparatus of FIG. 3 takes advantage of the ability of a wax actuator to exert a very large force over a comparatively short time interval. Because of the large force applied by the wax actuator, this remote-controlled valve mechanism can be used to close a valve element against very high pressures, and is therefore applicable to various high pressure steam and pneumatic systems. The latching mechanism relieves the force on the actuator piston as soon as latching takes place. Therefore, the full actuator force is applied only over comparatively short intervals. This avoids actuator failure due to continuous simultaneous application of high pressure and temperature. The actuator will withstand high temperatures for a long period of time so long as high pressure is not applied at the same time.

The mechanism of FIG. 3, of course, can be modified for use in various kinds of valves, including remote-controlled block valves in instrument manifolds. The latching mechanism is applicable to solenoid actuators and bellos actuators as well as to wax actuators. In the case of a solenoid actuator, a relatively large electrical current can be used to effect initial closure of the valve, and can be reduced as soon as latching takes place to a current level just sufficient to hold cam 118 against the force exerted by springs 126 and 128.

Various other modifications to the apparatus of FIG. 3 can be made without departing from the scope of the invention.

I claim:

1. A valve for use in draining a liquid system to prevent the liquid in the system from freezing under low ambient temperature conditions comprising:

means providing a valve chamber connectable to the liquid system, said valve chamber having a drain outlet;

a valve element cooperating with said drain outlet and movable from a first position towards a second position, the valve element in its first position closing the drain outlet and, during movement thereof towards its second position, opening the drain outlet;

means in contact with the valve element for urging the valve element towards its second position;

latch means connectable to the valve element for holding the valve element in its first position and releasable to permit the valve element to move towards its second position under the influence of the urging means;

a temperature sensor including a temperature sensing element that is in thermal contact with the liquid in the liquid system when the valve is connected to said system, and means responsive to the temperature sensing element for releasing the latch means when the temperature of the sensing element falls below a predetermined level;

means providing a heat-conductive housing surrounding at least a substantial part of the temperature sensing element, said means isolating the temperature sensing element from the ambient atmosphere substantially completely; and means for conducting heat from the liquid system to the heat-conductive housing when the valve chamber is connected to the liquid system;

whereby the valve is prevented from opening while the liquid in the liquid system is warm, yet responds rapidly to a drop in the ambient temperature when the liquid in the liquid system is cool.

2. A valve for use in draining a liquid system to prevent the liquid in the system from freezing under low ambient temperature conditions comprising:

means providing a valve chamber connectable to the liquid system, said valve chamber having a drain outlet;

a valve element cooperating with said drain outlet and movable from a first position towards a second position, the valve element in its first position closing the drain outlet and, during movement thereof towards its second position, opening the drain outlet;

means in contact with the valve element for urging the valve element towards its second position;

latch means coupled to the valve element for holding the valve element in its first position and releasable to permit the valve element to move towards its second position under the influence of the urging means;

a temperature sensor including a temperature sensing element that is in thermal contact with the liquid in the liquid system when the valve is connected to said system, and means responsive to the temperature sensing element for releasing the latch means when the temperature of the sensing element falls below a predetermined level;

means providing a heat-conductive housing surrounding at least a substantial part of the temperature sensing element so as to control the rate of heat loss from the housing; and means for conducting heat from the liquid system to the heat-conductive housing when the valve chamber is connected to the liquid system;

whereby the valve is prevented from opening while the liquid in the liquid system is warm, yet responds rapidly to a drop in the ambient temperature when the liquid in the liquid system is cool.

* * * * *

UNITED STATES PATENT AND TRADEMARK OFFICE
CERTIFICATE OF CORRECTION

PATENT NO. : 4,878,512
DATED : November 7, 1989
INVENTOR(S) : Fred L. Pirkle

It is certified that error appears in the above-identified patent and that said Letters Patent is hereby corrected as shown below:

On the cover page, the surname of the inventor should read "Pirkle".

On the cover page, the words "Assignee: Ogontz Controls, Willow Grove, PA" should be deleted.

Signed and Sealed this

Eighth Day of October, 1991

Attest:

HARRY F. MANBECK, JR.

*Attesting Officer*      *Commissioner of Patents and Trademarks*